Dec. 21, 1954  C. E. ZWEIDINGER  2,697,340
PHOTOGRAPHIC FLASHGUN STRUCTURE WITH INDICATOR MEANS
Filed Nov. 10, 1953
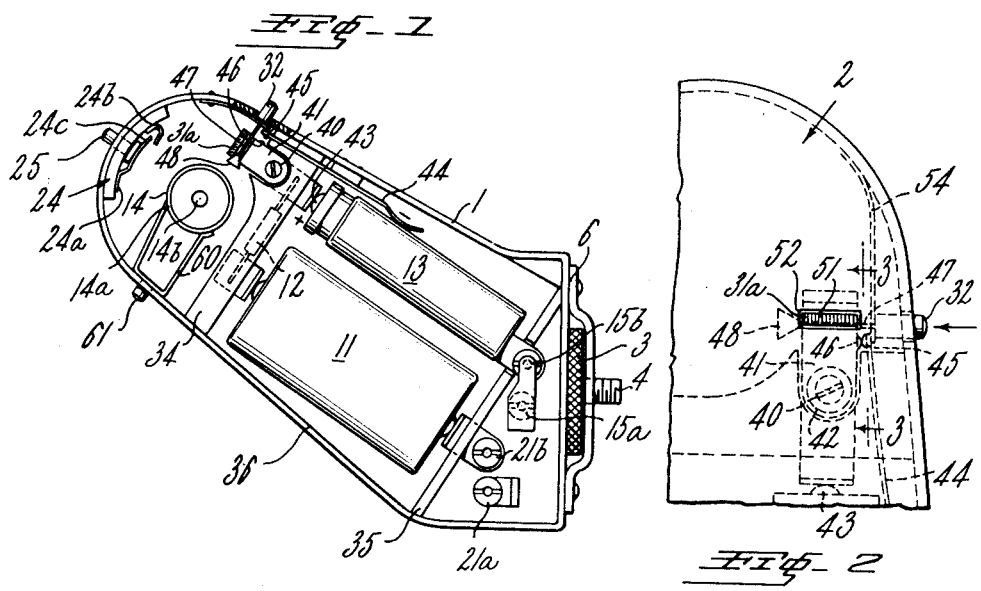
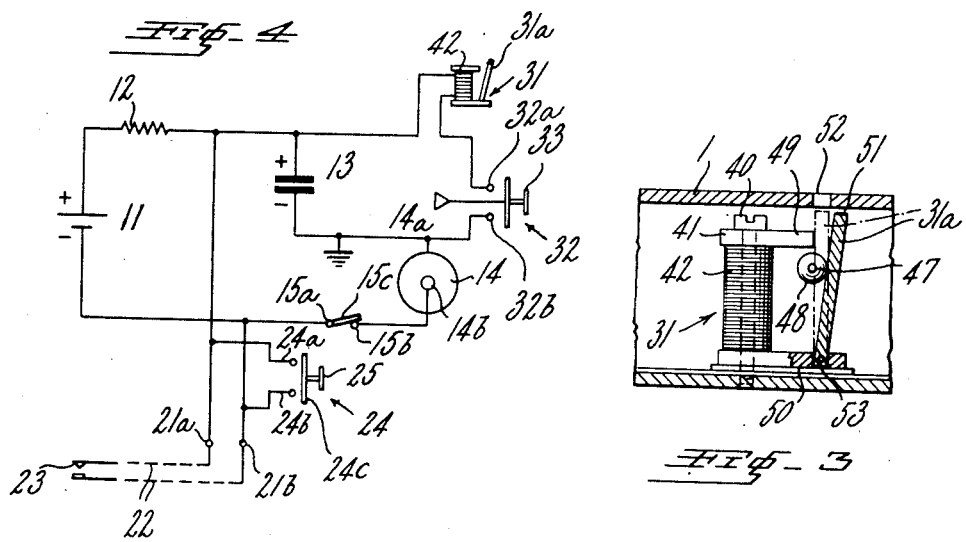
INVENTOR.
CARL E. ZWEIDINGER
BY United States Patent Office 2,697,340
Patented Dec. 21, 1954

2,697,340

PHOTOGRAPHIC FLASHGUN STRUCTURE WITH INDICATOR MEANS

Carl E. Zweidinger, New York, N. Y., assignor to Camera Optics Manufacturing Corp., New York, N. Y., a corporation of New York Application November 10, 1953, Serial No. 391,360

5 Claims. (Cl. 67—31)

The present invention relates to flashguns, and more particularly to a holder for photographic flashbulbs which are operated by the electric current.

It is one of the primary objects of the invention to provide means affording the testing of the flashbulb and the electric circuit therefore without bringing about a flashing effect.

It is another object of the present invention to provide means facilitating the attachment of the flashgun to a camera or the grasping of the flashgun by the hand of an operator in a very convenient manner, as the housing of the flashgun is especially shaped so that the fingers of the hand of the operator may readily operate a switch for the test circuit, a switch for the flashbulb circuit and a push button for the ejection of a used flashbulb while the hand of the operator may always remain in one and the same position with respect to the housing.

It is still another object to provide means ensuring the operation of electric circuit means first for testing the expected performance of and then for flashing of the flashbulb without regard to the condition whether the flashgun is attached to a camera or is supported by the hand of the operator.

Yet another object of the invention is to provide means demonstrating and indicating the operativeness of not only the flashbulb, but also of the power source and of the testing circuit.

It is a further object of the invention to provide means conducive to a streamlined and compact flashgun structure which may be used with cameras having a synchronized shutter, with external synchronizers, as well as with relatively inexpensive cameras using the so called "open flash" method.

It is a further object of the invention to provide means leading to a light-weight flashgun structure which is very reliable in operation, is simple to manufacture and to assemble.

According to a further feature of the invention, a test circuit is provided in the flashgun which includes, in series, a mechanically operated testing or indicator device, a normally open test switch, and a capacitor, whereby the charge on the latter, the battery, and associated electric circuits may be tested upon closing of said test switch; the flashbulb being operated after the capacitor has been charged.

Still another object of the present invention is to provide means affording considerable advantages over heretofore employed electric test bulbs or lamps in flashbulb circuits, whereby permanent mechanical or electro-mechanical indicator means is exposed to view to thereby signal to the operator testing result of the flashbulb circuit.

The present invention consequently avoids reliance on test bulbs which easily burn out and become inoperative, but rather proposes for the first time permanently operable indicator means of the mechanical or electro-mechanical type which work substantially automatically.

With the above objects in view, the present invention mainly consists of a flashgun whose housing contains flashbulb holder means with a pair of contacts, a battery in said housing, electric wiring or circuit means connecting said battery to said contacts for the flashbulb holder, and with a condenser or capacitor, switch means for testing said wiring and flashbulb, and further switch means for operating said flashbulb and for ejecting same after operation thereof.

These and other objects of the invention will be pointed out in the following description and claims and in the accompanying drawing, which discloses by way of example the principle of the invention and a preferred mode which has been contemplated in applying said principle.

In the drawing:

Figure 1 is a top plan view of a housing for a flashgun (with the cover thereof removed) embodying the invention;

Figure 2 is an enlarged fragmentary rear elevational view of the flashgun housing (with the cover applied thereto);

Figure 3 is an enlarged view of a detail employed in the invention and shown partly in section; and Figure 4 is a schematic circuit diagram for the flashgun embodying the invention.

Referring now to the drawing, and more particularly to Fig. 1, there is disclosed a housing 1 for a flashbulb. This housing 1 may be closed by a cover 2, which may be secured to the housing in any suitable manner, for example, by means of screws or spring catch (not shown). 3 is a knurled thumbscrew having a screw bolt 4 projecting therefrom to facilitate attachment of the flashgun to a camera. A suitable bracket 6 is secured to the housing 1 to carry said thumbscrew 3 for engagement position.

The circuits of the flashgun according to the invention will be hereinafter described.

The flashgun has incorporated therein essentially three circuits: a charging circuit, a flashing circuit, and a test circuit. The charging circuit serves to change a condenser or capacitor; the flashing circuit for suddenly discharging this condenser through a flashbulb to thereby flash the same; while a test circuit serves to test the flashbulb, and all other circuits of the flashgun.

*The charging circuits.*—11 indicates a battery which may preferably have a terminal voltage of about 22 volts. The same is connected to a resistor 12, preferably of about 2,000 to 4,000 ohms; this value is not critical, and will depend to some extent on the voltage of battery 11, and the speed with which recovery of the charge on the condenser is desired, as will appear more fully below.

The resistor 12 in turn is connected to a condenser or capacitor 13, which although of relatively large capacity, is of a sufficiently small size. It should be so connected that the polarity is the same as that of the battery, so that the battery may charge the condenser. The other side of condenser 13 is connected to one terminal 14a of a flashbulb socket 14; the other terminal 14b of the latter being connected to a socket 15a—15b, which is normally shunted by a spring contact 15c, the operation of which will be described further below.

From this socket 15a—15b connection is made to the other terminal of the battery 11. It is to be noted that a closed circuit is thereby established only when a flashbulb is inserted in the flashbulb holder 14, as follows: Battery 11, resistor 12, condenser 13 on the one side; and battery 11, socket 15a—15b with spring contact 15c, flashbulb socket 14 (whose terminals 14a and 14b are assumed to be connected by a flashbulb) to the other side of condenser 13. The condenser 13 will, therefore, be charged by the battery 11 through the flashbulb; the resistor 12 will limit the charging current to a value sufficiently small to prevent flashing of the flashbulb. However, when the flashbulb is removed from the socket, the connection between the battery and the condenser will be broken, thereby avoiding any drain on the battery due to leakage of the condenser. On the other hand, the condenser will build up a charge only when an operative flashbulb is inserted in the socket.

*The flashing circuit.*—The flashbulb will be operated by discharging the condenser suddenly through the flashbulb. This is accomplished by connecting one side of the condenser 13 to socket sleeve 21a, and connecting the other side of the condenser through the flashbulb to a socket sleeve 21b, and then shorting the socket together, for example by connecting them by means of a cable 22 to a synchronizing switch which is connected to a camera shutter (not shown) and indicated schematically at 23, in a known manner.

If it is desired to flash the bulb independently of any synchronizing switch, then a manual "open flash" switch 24 may be provided, by placing a pair of contacts 24a and 24b in parallel with sleeves 21a and 21b, respectively, and providing a contact member 24c which is manually operable, for example by push button 25. The flashing circuit is established as follows: Condenser 13, sleeve 21a (or contact 24a); cable 22, synchronizing switch 23; (or contact member 24c), sleeve 21b (or contact 24b); socket contacts 15a—15b, spring contact 15c, flashbulb socket 14 (and through the flashbulb inserted in the socket), and return to condenser 13.

*The test circuit.*—This circuit essentially consists of a small electromagnet device 31 and a switch 32 in series therewith and placed across the condenser. When the switch 32 is open, as shown in Fig. 4, then the device 31 will be inoperative. However, when a faultless flashbulb is inserted in socket 14, and the button 33 is operated to close switch 32 the device 31 will give an instantaneous signal, as will be later described. The operation of this test circuit is as follows: The condenser 13 will discharge through the device 31 and switch 32, causing armature 31a to be attracted as shown in dotted lines in Fig. 3; but it can do so only when electromagnet 31 is in the condenser circuit; an operative and faultless flashbulb is inserted into the socket 14. Therefore, the presence or absence, of attraction of armature 31a is had, when the switch 32 is operated, to test the continuity of the charging circuit including the flashbulb in socket 14.

It is to be noted that closing of the switch 32 or of the manual switch 24, will establish parallel circuits through which battery 11 may discharge; however, since the test switch 32, and the synchronizing switch 23 are operated only momentarily, no serious drain on the battery will result. Furthermore, the current of the battery is always limited by the resistor 12.

If the value of the resistor is increased, the time taken to build up a charge sufficient to flash a bulb will increase. However, the charging current itself will decrease.

If it is desired to flash more than one flashbulb, then another flashgun may be connected to sleeves 15a—15b.

Referring particularly to Figs. 1 and 4, it will be realized that insertion of the prongs of a connector into sleeves 15a—15b will lift the spring contact 15c from the position shown in Fig. 4. Thus, a second flashgun (not shown) will be placed in a series with socket 14, and the condenser will discharge through both flashbulbs, flashing both simultaneously. It has been found that a condenser of the size above indicated is capable of discharging with sufficient surge to flash more than one bulb. Of course the size of the condenser and the battery potential may be varied to suit the number of flashbulbs intended to be used.

When the sleeves 15a—15b are connected through spring contact 15c as shown in Fig. 4, and the series connection to a second flashgun is made before a flashbulb is inserted into socket 14, then a test can be made of the second flashgun, its bulb, and associated circuit, as well as of the bulb in the gun itself, since the condenser 13 will be charged by battery 11 only if a complete circuit is present from battery 11 to condenser 13; and only when a charge on the condenser 13 exists, will the test device 31 give an indication upon operation of switch 32.

The housing 1 and the location and position of the parts of the circuit means will now be described in detail, with reference to Figs. 1, 2 and 3.

The battery 11 is preferably placed between opposed battery terminals and the condenser or capacitor 13, preferably of the cartridge type, may be placed alongside the battery and clamped between spring terminals. The housing 1 is preferably made of metal; in this case an insulating liner 36 of fiberboard or the like is provided. To prevent damage to contacts and terminals, due to leakage of chemicals from the battery or the condenser, insulating barriers 35, 34 extend crosswise of the interior of the flashgun, and serve also as reinforcing members. The barrier 34 may be formed of plastic material and be molded so as to form a holder for the spool and magnet 41, 42 of electromagnetic device 31. The flashgun may have a slit or aperture to permit a spring 54 (forming part of switch 32) to engage the outside of the gun, thereby shorting the same to terminal 32b, which is connected to one side of the capacitor 13, and to one side of the flashbulb socket, for example, by being fastened to the metal housing 1. The other terminal 32a of switch 32 is connectable to spring 44 of condenser 13 to make contact at 45 with winding 46 of the magnet spool.

A flashbulb may be inserted into the flashbulb socket 14, connected to the housing 1. An ejector spring 60 is provided to cooperate with the socket 14, and operable by button 61 from the outside of the housing, to eject flashbulbs inserted into the socket, as is well known in the art.

The switch 24, permitting manual flashbulb operation when it is desired to take flash pictures by the "open flash" method, may be arranged in any suitable location on the housing. It is preferably so located as to be easily accessible by the fingers of the hand of an operator.

The terminals 15a, 15b, 21a and 21b must be insulated from each other, as illustrated in the drawing. If the housing 1 is of metal, insulating bushings may be used to separate the sleeves 15a, 15b from the metal housing 1.

Referring now more particularly to Figs. 1 and 2 of the drawing, there is disclosed an electromagnet 41 fixedly mounted in housing 1 by a screw bolt 40. Winding 42 is connected to contact 43 of the condenser or capacitor 13, whereas the other pole of the latter is adapted to make contact through spring 44 with the other end of the winding at 42. As may be realized from Figs. 1 and 2, spring 44 extends into the path of spring supported push button 33 and is thus movable with its end contact 45 against contact 46 of winding 42. Push button 33 has a stem 47 terminating in a wedge-shaped member 48. This stem 47 on which member 48 is held, extends within the space provided between the poles 49 and 50 of the electromagnet. In its retracted position push button 32 together with stem 47 take up the space between the armature 31a (shown in full lines) and poles 49 and 50 of the electromagnet device 31. As soon as push button 33 is pressed inwardly in the direction of the arrow (see Fig. 2) push button 33 causes end contact 45 to press against corresponding contact 46 (forming the other end of the winding) whereby the electromagnet 31 with its winding 42 is included in the test circuit hereinabove referred to and established through capacitor 13.

Since the wedge-shaped element 48 assumes an extended position as seen in Fig. 2, the armature 31a (as seen in dotted line position) is free to be attracted by the poles of the electromagnet device seen in dotted line position and its free end 51 which is suitably colored or carries any markings or a flag appears in and signals through window 52 of housing 1, that the circuit for flashing the flashbulb and the latter itself are faultless and operable.

As can be further seen from Fig. 3, armature 31a is linked adjacent pole 50 to swing thereabout. As soon as button 33 is released the same is retracted by means of spring 44 and, if desired, by a further retraction lead spring 54, to its initial position whereby the wedge-shaped element 48 effectively guides armature plate 31a back to its starting position (as seen in full lines).

It will be understood that each of the parts herein described may also find useful application in other types of flashguns differing from the type above referred to. While the invention has been illustrated and described as embodied in a battery-capacitor flashgun, it is not intended to be limited to the details shown, since various modifications and structural changes may be made.

Instead of an electromagnetic device operable by a push button with mechanical guide for separating the armature from the electromagnet, other suitable permanently operable appliances, such as relays, etc., may be employed for the purpose of the invention, which does not rely any more on possible defective test bulbs for testing the flashbulb circuit.

By applying current knowledge, the invention including the features that fairly constitute essential characteristics of the generic or specific aspects thereof, may be adapted to various applications; and such adaptations should and are intended to be comprehended within the meaning and range of equivalence of the following claims.

Having thus described the invention, what is claimed as new and desired to be secured by Letters Patent, is:

1. In a photographic flashgun having a housing with a window; first circuit means, second circuit means, a source of electric current supply for said second circuit means, electromagnetically operable test indicator means included in said first circuit means, a flashbulb with a holder therefor included in said second circuit means, capacitor means in series with said flashbulb holder and placed in said first circuit means and chargeable by said current supply source, and respective switch means in said first circuit means for operating the latter in which said test indicator means and said capacitor means are included and in said second circuit means for operating the latter in which said capacitor means and said flashbulb holder are included, said switch means for said first circuit means being constituted by a push button provided with a portion insertable in the path of the armature of said test indicator means, to thereby guide said armature from operative position back to inoperative position.

2. In a photographic flashgun according to claim 1, wherein said armature of said indicator means is disposed to move relative to said window provided in said flashgun housing.

3. In a photographic flashgun according to claim 1, wherein said insertable portion of said push button includes a surface angularly disposed relative to said electromagnetically operable test indicator means, said armature bearing against said surface, whereby upon pushing of said button said surface is displaced and said armature is free to move to operative position, release of said push button serving to retract said displaced surface thereby returning said armature to inoperative position.

4. In a photographic flashgun according to claim 1, wherein said second circuit means includes a resistor for charging said capacitor means.

5. In a photographic flashgun according to claim 4, including third switch means by-passing said source of electric current supply and said resistor of said second circuit means, whereby upon maintaining said first switch means open and said second switch means closed, closing of said third switch means effects firing of said flashbulb.

References Cited in the file of this patent

UNITED STATES PATENTS

| Number | Name | Date |
|---|---|---|
| 405,572 | Loomis | June 18, 1889 |
| 2,469,703 | Simkins | May 10, 1949 |
| 2,638,764 | Schwartz et al. | May 19, 1953 |